United States Patent
Loos et al.

(10) Patent No.: US 6,780,348 B1
(45) Date of Patent: Aug. 24, 2004

(54) FLAME RETARDANT ADDITIVES AND FLAME RETARDANT POLYMER COMPOSITIONS FORMED THEREWITH

(75) Inventors: Manon Loos, Corbias (BE); Susan D. Landry, Baton Rouge, LA (US); Dominique Fasbinder, Braives (BE)

(73) Assignee: Albemarle Corporation, Richmond, VA (US)

( * ) Notice: Subject to any disclaimer, the term of this patent is extended or adjusted under 35 U.S.C. 154(b) by 21 days.

(21) Appl. No.: 10/106,171

(22) Filed: Mar. 26, 2002

(51) Int. Cl.$^7$ .......................... C09K 21/08; C08K 5/06
(52) U.S. Cl. ..................... 252/609; 524/371; 524/373
(58) Field of Search ................... 252/609; 524/371, 524/373

(56) References Cited

U.S. PATENT DOCUMENTS

| | | | |
|---|---|---|---|
| 4,301,058 A | * 11/1981 | Neukirchen et al. | ........ 524/288 |
| 4,880,862 A | 11/1989 | Termine et al. | ............. 524/373 |
| 5,620,797 A | 4/1997 | Mallonee | |

FOREIGN PATENT DOCUMENTS

| | | |
|---|---|---|
| EP | 1127917 | 8/2001 |
| JP | 06172607 | 6/1994 |
| JP | 07216160 | 8/1995 |
| JP | 08092445 | 4/1996 |
| JP | 08208939 | 8/1996 |
| JP | 11158329 | 6/1999 |
| JP | 2000344973 | 12/2000 |

OTHER PUBLICATIONS

Japanese Patent Office machine translation of 08–092445 (Apr. 9, 1996), Keiko et al.*
Japanese Patent Office machine translation of 06–172607 (Jun. 21, 1994), Fukushima Toshiaki.*
Japanese Patent Office machine translation of 07–216160 (Aug. 15, 1995), Chone et al.*
Japanese Patent Office machine translation of 08–208939 (Aug. 13, 1996), Rei et al.*
Japanese Patent Office machine translation of 11–158329 (Jun. 15, 1999), Kiyono Mitsuru.*
Japanese Patent Office machine translation of 2000–344973 (Dec. 12, 2000), Ryo Shorin.*
CAPLUS Abstract of JP 11158329 A2, issued Jun. 1999, AN No. 1999–378585.
WPIDS Abstract of JP 11158329 A, issued Jun. 1999, AN No. 1999–400285.
JAPIO Abstract of JP 11158329, issued Jun. 1999, AN No. 1999–158329.
ESPACENET database Abstract of JP 11158329 A2, issued Jun. 1999.

(List continued on next page.)

Primary Examiner—Matthew A. Thexton

(57) ABSTRACT

Thermally stable flame retardant additive compositions comprise a mixture of (1) a polybromodiphenylalkane and/or a polybromodiphenyl oxide, (2) a tetrabromobisphenol-A-bis(bromoalkyl ether), and preferably (3) a synthetic zeolite and/or hydrotalcite in specified proportions. Such additives are useful in thermoplastic polymers, such as homopolymers and copolymers of vinylaromatic monomers, and polyolefin polymers, especially impact or rubber-modified polystyrenes, and most especially HIPS.

56 Claims, 2 Drawing Sheets

OTHER PUBLICATIONS

CAPLUS Abstract of JP 2000344973 A2, issued Dec. 2000, AN No. 2000:873347.
WPIDS Abstract of JP 2000344973 A. issued Dec. 2000, AN No. 2001–248128.
JAPIO Abstract of JP 2000344973, issued Dec. 2000, AN No. 2000–344973.
ESPACENET database Abstract of JP 2000344973, issued Dec. 2000.
WPIDS Abstract of JP10175893 A, issued Jun. 1998. AN No. 1998–422323.
Wpids Abstract of TW 224479 A, issued Jun. 1994, An No. 1994–216369.
CAPLUS Abstract of JP 06172607 A2, issued Jun. 1994, AN No. 1994:581241.
WPIDS Abstract of JP 06172607 A, issued Jun. 1994, AN No. 1994–238929.
JAPIO Abstract of JP 06172607 A, issued Jun. 1994, AN No. 1994–172607.
ESPACENET database Abstract of JP 06172607, issued Jun. 1994.
CAPLUS Abstract of JP 07216160 A2, issued Aug. 1995, AN No. 1995:943580.
WPIDS Abstract of JP 07216160 A, issued Aug. 1995, AN No. 1994–216369.
JAPIO Abstract of JP 07216160, issued Aug. 1995, AN No. 1995–216160.
CAPLUS Abstract of JP 08092445 A2, issued Apr. 1996, AN No. 1996:431170.
WPIDS Abstract of JP 08092445 A, issued Apr. 1996, AN No. 1996–236233.
JAPIO Abstract of JP 08092445 A2, issued Apr. 1996, AN No. 1996–092445.
ESPACENET database Abstract of JP 08092145 A2, issued Apr. 1996.
CAPLUS Abstract of JP 08208939 A2, issued Aug. 1996, AN No. 1996:624816.
WPIDS Abstract of JP 08208939 A, issued Aug. 1996, AN No. 1996–422121.
JAPIO Abstract of JP 08208939 A, issued Aug. 1996, AN No. 1996–208939.
ESPACENET database Abstract of JP 08208939 A, issued Aug. 1996.

* cited by examiner

US 6,780,348 B1

FLAME RETARDANT ADDITIVES AND FLAME RETARDANT POLYMER COMPOSITIONS FORMED THEREWITH

TECHNICAL FIELD

This invention relates to additive compositions that serve as flame retardants and that have the capability, when blended with suitable thermoplastic polymers, of providing thermally-stable flame-retardant thermoplastic polymer compositions. This invention also relates to the resultant flame retarded polymer compositions.

BACKGROUND

Over the years much effort has been devoted to the discovery and development of effective flame retardants for use in thermoplastic polymers.

Japan Kokai 08-208939 A2, laid open Aug. 13, 1996, describes flame retarded compositions composed of (A) HIPS containing (B) 4–8 parts of tetrabromobisphenol-A and polyhalogenated aliphatic ether derivatives, (C) polyhalogenated diphenylalkanes in an amount of 20–50% of the amount of (B), (D) $Sb_2O_3$, and (E) 0.0005–0.05% (as Si) of organic polysiloxane. According to this prior disclosure, the amount by weight of the polyhalogenated diphenylalkanes to be used is at most one-half of the amount of tetrabromobisphenol-A and polyhalogenated aliphatic ether derivatives used. It has been found that such compositions possess poor thermal stability.

Thus, while in many cases effective flame retardancy can be achieved by various flame retardant additives, one or more other properties of the resultant polymer compositions, such as thermal stability, may be sacrificed. In particular, a need exists for a new, effective flame retardant having high thermal stability for use in thermoplastic polymers and little, if any, tendency to bloom when used in polyolefin polymers.

Thus a welcome contribution to the art of would be the provision of new additive compositions of enhanced thermal stability that have the capability, when blended with suitable thermoplastic polymers, of providing thermoplastic polymer compositions having enhanced thermal stability, especially if this could be accomplished on an economically-attractive basis. It would also be very welcome contribution to provide an effective thermally-stable flame retardant additive composition which has little, if any, blooming tendency when used in blends with polyolefins. This invention is deemed to constitute such a contribution.

BRIEF SUMMARY OF THE INVENTION

Provided by this invention in one of its embodiments is a flame retardant additive composition which comprises a mixture of:
 a) (i) at least one polybromodiphenylalkane in which the phenyl groups are substituted by a total of at least 6 bromine atoms per molecule and in which the alkane portion of the molecule contains 1 to 3 carbon atoms, preferably 2 carbon atoms or (ii) at least one polybromodiphenyl oxide in which the phenyl groups are substituted by a total of at least 6 bromine atoms per molecule, or (iii) a mixture of (i) and (ii); and
 b) at least one tetrabromobisphenol-A-bis(bromoalkyl ether);
wherein a) and b) are in proportions such that per each 100 parts by weight of a) and b), 50 to 80 parts by weight are a) and 50 to 20 parts by weight are b). Thus contrary to the teachings of the above Japanese Kokai, in this embodiment of the invention the amount by weight of component a) used is at least the same as, or more than, the amount of component b).

A preferred embodiment is a flame retardant additive composition which comprises a mixture of:
 a) (i) at least one polybromodiphenylalkane in which the phenyl groups are substituted by a total of at least 6 bromine atoms per molecule and in which the alkane portion of the molecule contains 1 to 3 carbon atoms, preferably 2 carbon atoms or (ii) at least one polybromodiphenyl oxide in which the phenyl groups are substituted by a total of at least 6 bromine atoms per molecule, or (iii) a mixture of (i) and (ii);
 b) at least one tetrabromobisphenol-A-bis(bromoalkyl ether); and
 c) at least one synthetic zeolite or at least one hydrotalcite, or both;
wherein a) and b) are in proportions such that per each 100 parts by weight of a) and b), 20 to 80 parts by weight are a) and 80 to 20 parts by weight are b), and wherein c) is in an amount such that there is one part by weight thereof per each 4 to 6 parts by weight of b) in the composition. As between the zeolite(s) and the hydrotalcite(s), use of the synthetic zeolite as c) is more preferred. As will be seen hereinafter, the presence of component c) greatly enhances the thermal stability of the compositions and thus makes possible, inter alia, use of proportions described in the above Japanese Kokai with satisfactory results.

In another preferred embodiment there is provided a flame retardant additive composition which comprises a mixture of:
 a) at least one polybromodiphenylalkane in which the phenyl groups are substituted by a total of at least 6 bromine atoms per molecule and in which the alkane portion of the molecule contains 1 to 3 carbon atoms, preferably 2 carbon atoms; and
 b) at least one tetrabromobisphenol-A-bis(bromoalkyl ether);
wherein a) and b) are in proportions such that per each 100 parts by weight of a) and b), 50 to 80 parts by weight are a) and 50 to 20 parts by weight are b).

Still another preferred embodiment is a flame retardant additive composition which comprises a mixture of:
 a) at least one polybromodiphenylalkane in which the phenyl groups are substituted by a total of at least 6 bromine atoms per molecule and in which the alkane portion of the molecule contains 1 to 3 carbon atoms, preferably 2 carbon atoms;
 b) at least one tetrabromobisphenol-A-bis(bromoalkyl ether);
 c) at least one synthetic zeolite or at least one hydrotalcite, or both;
wherein a) and b) are in proportions such that per each 100 parts by weight of a) and b), 20 to 80 parts by weight are a) and 80 to 20 parts by weight are b), and wherein c) is in an amount such that there is one part by weight thereof per each 4 to 6 parts by weight of b) in the composition. As between the zeolite(s) and the hydrotalcite(s), use of the synthetic zeolite as c) is more preferred.

Yet another embodiment of this invention is a flame retardant additive composition which comprises a mixture of:
 a) at least one polybromodiphenyl oxide in which the phenyl groups are substituted by a total of at least 6 bromine atoms per molecule; and b) at least one tetrabromobisphenol-A-bis(bromoalkyl ether);

wherein a) and b) are in proportions such that per each 100 parts by weight of a) and b), 50 to 80 parts by weight are a) and 50 to 20 parts by weight are b).

A further embodiment of this invention is a flame retardant additive composition which comprises a mixture of:
a) at least one polybromodiphenyl oxide in which the phenyl groups are substituted by a total of at least 6 bromine atoms per molecule;
b) at least one tetrabromobisphenol-A-bis(bromoalkyl ether); and
c) at least one synthetic zeolite or at least one hydrotalcite, or both;

wherein a) and b) are in proportions such that per each 100 parts by weight of a) and b), 20 to 80 parts by weight are a) and 80 to 20 parts by weight are b), and wherein c) is in an amount such that there is one part by weight thereof per each 4 to 6 parts by weight of b) in the composition. As between the zeolite(s) and the hydrotalcite(s), use of the synthetic zeolite as c) is more preferred.

Further embodiments of this invention include a flame retardant polymer composition comprised of at least one thermoplastic polymer with which has been blended, separately or in combination, a flame-retardant amount of:
a) (i) at least one polybromodiphenylalkane in which the phenyl groups are substituted by a total of at least 6 bromine atoms per molecule and in which the alkane portion of the molecule contains 1 to 3 carbon atoms, preferably 2 carbon atoms or (ii) at least one polybromodiphenyl oxide in which the phenyl groups are substituted by a total of at least 6 bromine atoms per molecule, or (iii) a mixture of (i) and (ii); and
b) at least one tetrabromobisphenol-A-bis(bromoalkyl ether);

in proportions such that per each 100 parts by weight of a) and b), 50 to 80 parts by weight are a) and 50 to 20 parts by weight are b). Preferably such polymer composition further contains as component c) at least one synthetic zeolite or at least one hydrotalcite, or both, in an amount such that there is one part by weight thereof per each 4 to 6 parts by weight of b) blended with said thermoplastic polymer. When component c) is used, components a) and b) can be in proportions such that per each 100 parts by weight of a) and b), 20 to 80 parts by weight are a) and 80 to 20 parts by weight are b). As between the zeolite(s) and the hydrotalcite(s), use of the synthetic zeolite as component c) is more preferred. Still further embodiments are each of the flame retardant polymer compositions as described in this paragraph wherein a) is (i) thereof. Additional embodiments are each of the flame retardant polymer compositions as described in this paragraph wherein a) is (ii) thereof.

Still additional embodiments include a method of flame retarding a thermoplastic polymer, which method comprises blending with such polymer, separately or in combination, a flame-retardant amount of:
a) (i) at least one polybromodiphenylalkane in which the phenyl groups are substituted by a total of at least 6 bromine atoms per molecule and in which the alkane portion of the molecule contains 1 to 3 carbon atoms, preferably 2 carbon atoms or (ii) at least one polybromodiphenyl oxide in which the phenyl groups are substituted by a total of at least 6 bromine atoms per molecule, or (iii) a mixture of (i) and (ii); and
b) at least one tetrabromobisphenol-A-bis(bromoalkyl ether);

in proportions such that per each 100 parts by weight of a) and b), 50 to 80 parts by weight are a) and 50 to 20 parts by weight are b). Preferably in conducting such method, component c) is also blended with such polymer separately or in combination with a) and/or b), component c) being at least one synthetic zeolite or at least one hydrotalcite, or both, in an amount such that there is one part by weight thereof per each 4 to 6 parts by weight of b) blended with said thermoplastic polymer. When component c) is used, components a) and b) can be in proportions such that per each 100 parts by weight of a) and b), 20 to 80 parts by weight are a) and 80 to 20 parts by weight are b). As between the zeolite(s) and the hydrotalcite(s), use in the blending of the synthetic zeolite is more preferred. Still further embodiments are each of the methods as described in this paragraph wherein a) is (i) thereof. Additional embodiments are each of the methods described in this paragraph wherein a) is (ii) thereof.

Flame retardant molded or extruded articles or shapes made from any of the foregoing flame retardant thermoplastic polymers of this invention, and methods of forming such articles or shapes are still further embodiments of this invention.

In the various embodiments of this invention in which component c) is used, preferably the proportions of components a) and b) are such that per each 100 parts by weight of a) and b), 50 to 80 parts by weight are a) and 50 to 20 parts by weight are b).

In all embodiments of this invention, whether or not component c) is used, more preferred proportions of a) and b) are such that per each 100 parts by weight of a) and b), 60 to 75 parts by weight are a) and 40 to 25 parts by weight are b), and still more preferred proportions of a) and b) are such that per each 100 parts by weight of a) and b), about 70 parts by weight are a) and about 30 parts by weight are b).

In the all of the embodiments of this invention, preferably, component a) is decabromodiphenyl oxide, and more preferably is 1,2-bis(pentabromophenyl)ethane (a.k.a. decabromodiphenylethane). Preferably component b) is tetrabromobisphenol-A-bis(2,3-dibromopropyl ether).

Other embodiments and features of this invention will be still further apparent from the ensuing description, accompanying drawings, and appended claims.

FURTHER DETAILED DESCRIPTION OF THE INVENTION

Figure 1:
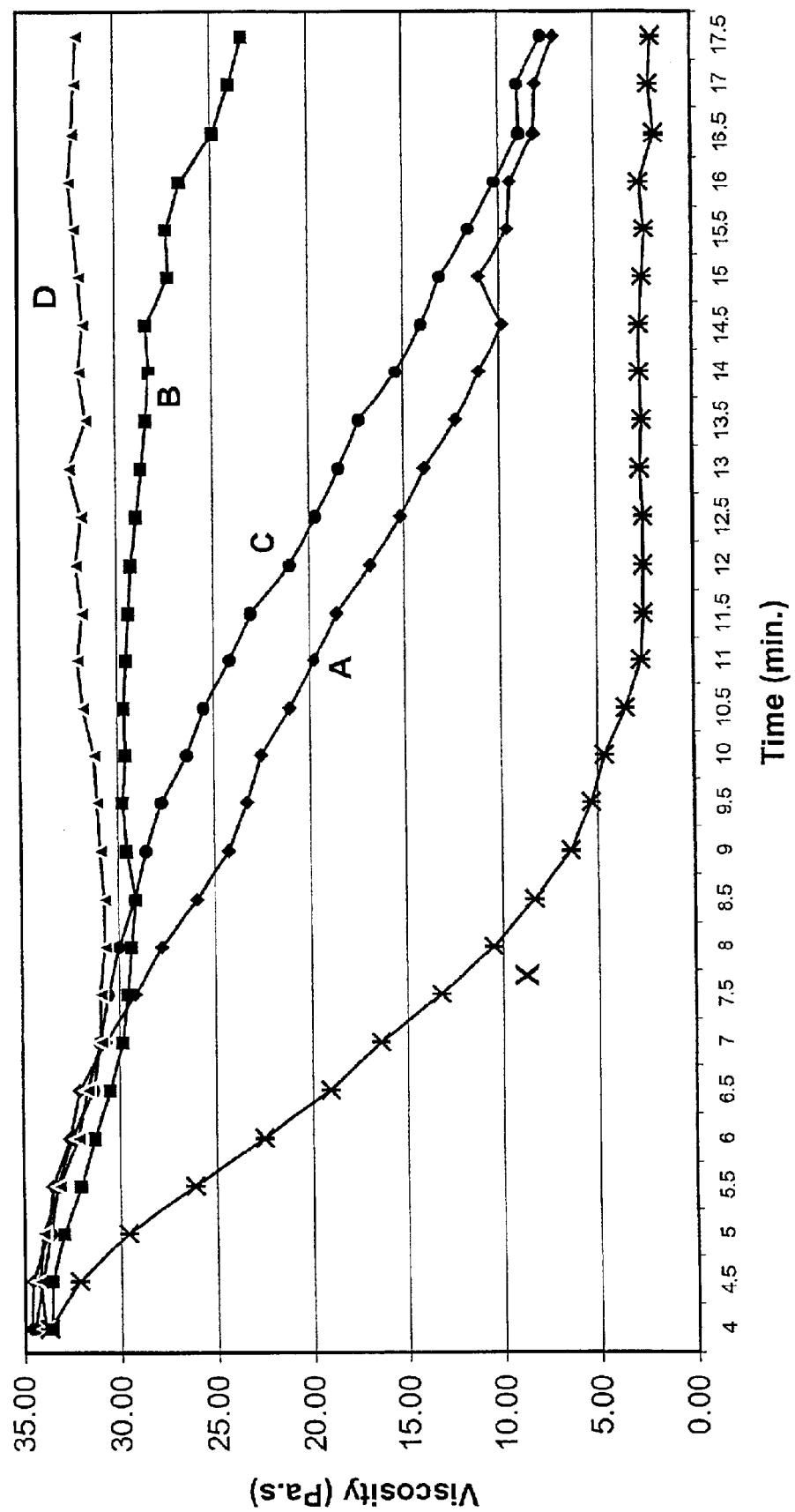
FIG. 1 is a group of plots of thermal stability data obtained at 270° C. using capillary rheometry in which the thermal stabilities of four flame retarded compositions of this invention are compared with the thermal stability of a composition not of this invention. The composition not of this invention is one in which the brominated flame retardants were used in proportions taught in the prior art.

Component a) of this invention is preferably one or more polybromodiphenylalkanes in which the phenyl groups are substituted by a total of at least 6 bromine atoms per molecule, preferably a total of at least 8 bromine atoms per molecule, and most preferably by a total of 10 bromine atoms per molecule. Thus the two phenyl groups of these component a) compounds can be substituted by a total of 6, 7, 8, 9, or 10 bromine atoms, and mixtures of any two or more such component a) compounds having such differing total bromine substitution are within the scope of this invention. In addition the alkane portion of the molecule of a component a) compound contains 1 to 3 carbon atoms, preferably 2 carbon atoms, and can be substituted by one or more bromine atoms. Thus this alkane portion is a divalent alkylene group having 1 to 3 carbon atoms and 0 to 2 bromine atoms per carbon atom of the alkylene group (for a total of up to 6 bromine atoms where the alkylene group has 3 carbon atoms). Examples of such alkylene groups include methylene, dimethylene, trimethylene, ethylidene, 1,1-propylidene, 2,2-propylidene, bromomethylene, dibromomethylene, bromodimethylene, 1,2-dibromodimethylene, tribromodimethylene, tetrabromodimethylene, 1-bromotrimethylene, 2-bromotrimethylene 1,2-dibromotrimethylene, 1,3-dibromotrimethylene, 2,2-dibromotrimethylene, and so on. Again, mixtures of two or more component a) compounds having such differing alkane and/or differing bromoalkane moieties connecting the bromine-substituted phenyl groups are within the scope of this invention. In general, the greater the number of bromine atoms on the phenyl groups, the more preferred is the compound, and this applies whether or not the alkylene group is substituted by one or more bromine atoms. Compounds in which the alkylene group is a dimethylene group are preferred. When the alkylene group is substituted by bromine, it is preferred that no carbon atom of the alkylene group be substituted by more than one bromine atom. And of the compounds in which the alkylene group is substituted by bromine, preferred are those in which the phenyl groups are both substituted by 5 bromine atoms, i.e., they are both pentabromophenyl groups.

A few non-limiting examples of such preferred component a) compounds include bis(tribromophenyl)methane, bis(tetrabromophenyl)methane, bis(pentabromophenyl)methane, (tribromophenyl)(tetrabromophenyl)methane, (tetrabromophenyl)(pentabromophenyl)methane, bis(pentabromophenyl)bromomethane, bis(pentabromophenyl)dibromomethane, bis(tribromophenyl)ethane, 1,2-bis(tetrabromophenyl)ethane, 1,2-1,1-bis(pentabromophenyl)bromoethane, 1,2-bis(pentabromophenyl)1,2-dibromoethane, 1,1-(pentabromophenyl)-2,2,2-tribromoethane, 1-(pentabromophenyl)-2-(tetrabromophenyl)ethane, 2,2-bis(tetrabromophenyl)propane, 2,2-bis(pentabromophenyl)propane, 1,2-bis(pentabromophenyl)propane, 1,3-bis(pentabromophenyl)propane, 2,2-bis(pentabromophenyl)-1,3-dibromopropane, and the like, as well as mixtures of two or more of such compounds. Most preferred as component a) in the practice of this invention is 1,2-bis(pentabromophenyl)ethane (a.k.a., decabromodiphenylethane), which is available commercially as Saytex® 8010 flame retardant (Albemarle Corporation).

Instead of one or more polybromodiphenylalkanes as above described, component
   a) can be either (1) at least one polybromodiphenyl oxide in which the phenyl groups are substituted by a total of at least 6 bromine atoms per molecule, more preferably at least 8 bromine atoms, and most preferably by 10 bromine atoms, or (2) a mixture or combination of one or more polybromodiphenylalkanes as above described, and one or more such polybromodiphenyl oxides. Thus the two phenyl groups of these component a) compounds can be substituted by a total of 6, 7, 8, 9, or 10 bromine atoms, and mixtures of any two or more such component a) compounds having such differing total bromine substitution are within the scope of this invention.

Non-limiting examples of polybromodiphenyl oxides, which can be used alone or in combination with one or more polybromodiphenylalkanes as component a), include the following: hexabromodiphenyl oxide, heptabromodiphenyl oxide, octabromodiphenyl oxide, nonabromodiphenyl oxide, decabromodiphenyl oxide, and any mixtures of any two or more such compounds.

In the case of polybromodiphenylalkanes or polybromodiphenyl oxides which have 6 to 9 total bromine atoms as ring substituents, it matters not how or where those 6 to 9 bromine atoms are distributed on the two phenyl groups.

When one or more polybromodiphenylalkanes are used with one or more polybromodiphenyl oxides as component a), these respective compounds can be used in any relative proportions to each other. The important feature of this invention as regards proportions is the relative proportions as between a) the polybromodiphenylalkane(s) and/or the polybromodiphenyl oxide(s) and b) the tetrabromobisphenol-A-bis(2,3-dibromopropyl ether).

Component b) is tetrabromobisphenol-A-bis(2,3-dibromopropyl ether), which is available commercially in several forms as Saytex® HP-800A flame retardant, and Saytex® HP-800AG flame retardant (Albemarle Corporation). Although less preferred it is possible pursuant to this invention to use other bromoalkylethers of tetrabromobisphenol-A, such as tetrabromobisphenol-A-bis(bromomethyl ether), tetrabromobisphenol-A-bis(dibromomethyl ether), tetrabromobisphenol-A-bis(tribromomethyl ether), tetrabromobisphenol-A-bis(1,2-dibromoethyl ether), tetrabromobisphenol-A-bis(4-bromobutyl ether), tetrabromobisphenol-A-bis(3,4-dibromobutyl ether), and in general any mono or dibromoalkyl ether of tetrabromobisphenol-A in which the alkyl group or the two alkyl groups each contain up to about 12 carbon atoms.

The relative proportions between component a) and component b) can be varied provided that of the total of components a) and b), 50 to 80 wt % is component a) with the balance to 100 wt % being component b). Preferred relative proportions of components a) and b) are such that of the total of components a) and b), 60 to 75 wt % is component a) with the balance to 100 wt % being component b). Particularly preferred is a ratio of about 70 wt % of component a) and about 30 wt % of component b).

In preferred embodiments, various synthetic zeolites can be used as component c), including the following: Zeolites A, X, M, F, B, H, J, W, Y, and L described respectively in U.S. Pat. Nos. 2,822,243; 2,822,244; 2,995,423; 2,996,358; 3,008,803; 3,010,789; 3,011,869; 3,102,853; 3,130,007; and 3,216,789, respectively. Still other synthetic zeolites are known, such as ZSM-5, and these can be used. In all cases, the zeolite should be used in the form of a fine dry powder, free of lumps or clumps. From the cost-effectiveness standpoint zeolite-A is a preferred material. In a preferred embodiment, the selected zeolite is calcined before use in order to reduce its water content without materially disrupting its physical structure or average pore size. For example, zeolite-A typically contains about 18.5% water, and calcining can prove useful in reducing this water content, thereby increasing its usefulness in the compositions of this invention. Other zeolites such as zeolite-X which typically contains about 24% water, and zeolite-Y which has a typical water content of about 25% may also be improved for use in this invention by calcining them prior to use to reduce their water contents but without destroying their structure. An advantage of zeolite ZSM-5 is its normal low content of water, about 5%.

Also found useful as additive component c) in the practice of this invention is a hydrotalcite additive, such as a magnesium hydrotalcite. Such an additive has been found when used with components a) and b) to even further increase the thermal stability of such additive compositions of this invention. Suitable hydrotalcites for use in this invention include those represented by the general formula:

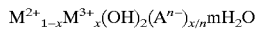

$$M^{2+}{}_{1-x}M^{3+}{}_x(OH)_2(A^{n-})_{x/n}mH_2O$$

wherein $N^{2+}$ is selected from the group consisting of $Mg^{2+}$, $Ca^{2+}$, $Sr2+$, $Ba^{2+}$, $Zn^{2+}$, $Cd^{2+}$, $Pb^{2+}$, $Sn^{2+}$, or $Ni^{2+}$; $M^{3+}=Al^{3+}$, $B^{3+}$; or $Bi^{3+}$; An is an anion having a valence of n, preferably selected from the group consisting of $OH^-$, $Cl^-$, $Br^-$, $I^-$, $ClO_4—$, $HCO_3—$, $CH_3COO^-$. $C_6H_5COO^-$, $CO_32$-, $SO_42$-, $(COO^-)_2$, $(CHOH)_4CH_2OHCOO^-$. $C_2H_4(COO)_22$-, $(CH_2COO)_22$-, $CH_3CHOHCO^-$, $SiO_32$-, $SiO_44$-, $Fe(CN)_6$ 3-, $Fe(CN)_64$- or $HPO_42$-; n is from about 1 to about 4; x is from about 0 to about 0.5; and m is from about 0 to about 2. Preferably, $M^{2+}$ is $Mg^{2+}$ or a solid solution of Mg and Zn, $M^{3+}$ is $Al^{3+}$; $A^{n-}$ is $CO_32$-, x is a number from 0 to 0.5, and m is a number from 0 to 2.

Exemplary hydrotalcites include, but are not necessarily limited to: $Al_2O_3.6MgO.CO_2$. $12H_2O$; $Mg_{4.5}Al_2(OH)_{13}.CO_3.3,5H_2O$; $4MgO.Al_2O_3CO_2.9H_2O$; $4MgO.Al_2O_3.CO_2.6H_2O$; $ZnO.3MgO.Al_2O_3.CO_2.8-9H_2O$ and $ZnO.3MgO.Al_2O_3.CO_2.5-6H_2O$.

Hydrotalcites are commercially available from Kyowa Chemical Company under the trade designations DHT-4A, DHT-4C and DHT-4V, and from J. M. Huber Corporation under the trade designations Hysafe 539 and Hysafe 530. DHT4A2 hydrotalcite has been found especially useful in further increasing thermal stability.

Mixtures of at least one synthetic zeolite and at least one hydrotalcite can also be used. As noted above, as between the zeolite(s) and the hydrotalcite(s), use of the zeolite is more preferred.

In the preferred embodiments wherein at least one zeolite and/or at least one hydrotalcite is included in the composition as component c), the amount of the zeolite and/or hydrotalcite, most preferably zeolite-A, is proportioned to the amount of component b) so that there is one part by weight of the zeolite and/or hydrotalcite per each 4 to 6 parts by weight of component b). More preferably there is one part by weight of the zeolite and/or hydrotalcite per each 4.5 to 5.5 parts by weight of component b). The most preferred ratio is about one part by weight of the zeolite and/or hydrotalcite per each 5 parts by weight of component b).

Other flame retardants may be included in the compositions of this invention provided they do not materially reduce the flame retardant effectiveness of the composition or detract from its thermal stability. Other flame retardants which are deemed suitable candidates for use in the compositions of this invention include aromatic bromine-containing flame retardants such as tetrabromobisphenol-A, pentabromobenzene, hexabromobenzene, pentabromotoluene, octabromobiphenyl, nonabromobiphenyl, decabromobiphenyl, tetrabromobisphenol-S, brominated aromatic carbonate oligomers; brominated epoxy oligomers; pentabromobenzyl polyacrylate; octabromotrimethylphenylindane; tris (tribromophenyl)cyanurate; and similar known organic bromine-containing flame retardants. Chlorine-containing flame retardants such as the chlorine-containing flame retardants available commercially under the trade marks DECHLORANE® and DECHLORANE PLUS® are also suitable candidate supplemental flame retardants. Preferred ancillary flame retardants include tris(tribromophenyl) triazine, tris(tribromoneopentyl)phosphate, and tetrabromobisphenol-A.

The thermoplastic polymer compositions to which this invention is especially adapted are thermoplastic polymers having polymerized ethylenic linkages. By this is meant that the structure of the polymer includes polymer units formed from one or more monomers having a polymerizable terminal $CH_2=CR$— group which enters into the formation of the polymer. Such polymers are typified by (i) polyolefin polymers, (ii) vinylaromatic polymers, (iii) functionally-substituted alpha-olefin polymers, and (iv) elastomers derived at least in part from diene monomers copolymerized with one or more monomers of (i), (ii), and/or (iii). Polyolefin polymers are formed by homopolymerization or copolymerization of alpha-olefin monomers having in the range of 2 to about 8 carbon atoms, non-limiting examples of which are polyethylene, polypropylene, polybutene, polyisobutylene, and copolymers such as ethylene-propylene copolymers, and ethylene copolymerized with one or more such monomers as 1-pentene, 3-methyl-1-butene, 1-hexene, 4-methyl-1-pentene, 1-heptene, 1-octene, or analogs thereof. The vinylaromatic polymers (also sometimes referred to as styrenic polymers) are homopolymers or copolymers formed from vinylaromatic monomers having 8 to about 16 carbon atoms per molecule, such as styrene, 2-methylstyrene, 3-methylstyrene, 4-methylstyrene, 2,4-dimethylstyrene, alpha-methylstyrene, 4-tert-butylstyrene, 3,5-diethylstyrene, 2,4,5-trimethylstyrene, vinylnaphthalene, or analogs thereof. Functionally-substituted alpha-olefin polymers which may be used in the practice of this invention are copolymers of at least one 1-olefin and/or styrenic monomer and at least one copolymerizable carboxylic acid, carboxylic acid ester and/or nitrile, non-limiting examples of which include ethylene-acrylic acid copolymer, ethylene-vinylacetate copolymer, ethylene-acrylonitrile copolymer, ABS, MABS, SAN, and similar materials. Elastomers derived at least in part from polymerized diene monomers which may be used in the practice of this invention include elastomeric terpolymers of ethylene, propylene, and at least one diene such as norbornadiene or hexadiene, butadiene-styrene elastomers, butadiene-acrylonitrile elastomers, and similar materials.

The additive compositions of this invention can also be used in polymer blends containing substantial proportions of one or more styrenic polymers such as polyphenylene ether/polystyrene, polyphenylene ether/HIPS, or aromatic polycarbonate/ABS blends.

Other thermoplastic polymers which may be flame retarded pursuant to this invention include such engineering thermoplastics as polyphenylene ethers, aromatic polycarbonates, polyamides, polyesters, polysulfones, and polyoxymethylenes.

Preferred substrate or host polymers are the polyolefin homopolymers and copolymers, especially those based in whole or in part on ethylene or propylene. More preferred are the vinylaromatic polymers. These can be homopolymers, copolymers or block polymers and such polymers can be formed from such vinylaromatic monomers as styrene, ring-substituted styrenes in which the substituents are one or more $C_{1-6}$ alkyl groups and/or one or more halogen atoms, such as chlorine or bromine atoms, alpha-methylstyrene, ring-substituted alpha-methylstyrenes in which the substituents are one or more $C_{1-6}$ alkyl groups and/or one or more halogen atoms, such as chlorine or bromine atoms, vinylnaphthalene, and similar polymerizable styrenic monomers—i.e., styrenic compounds capable of being polymerized by means of peroxide or like catalysts into thermoplastic resins. Homopolymers and copolymers of simple styrenic monomers (e.g., styrene, p-methylstyrene, 2,4-dimethylstyrene, alpha-methyl-styrene, p-chlorostyrene, etc.) are preferred from the standpoints of cost and availability.

Impact-modified polystyrenes (IPS) that are preferably used may be medium-impact polystyrene (MIPS), high-impact polystyrene (HIPS), or blends of HIPS and GPPS (sometimes referred to as crystal polystyrene). These are all conventional materials. The rubber used in effecting impact modification is most often, but need not be, a butadiene rubber. High-impact polystyrene or blends containing a major amount (greater than 50 wt %) of high-impact polystyrene together with a minor amount (less than 50 wt %) of crystal polystyrene are among preferred substrate or host polymers. Particularly preferred thermoplastic polymers in which the flame retardant additive compositions of this invention are used are the high-impact polystyrene polymers (HIPS), whether or not they contain crystal polystyrene.

The quantity of the a) and b) additive components (with or without one or more zeolites and/or hydrotalcites, and/or optional supplemental flame retardants) used in the thermoplastic polymer composition such as a polymer having polymerized ethylenic linkages will vary somewhat depending on such factors as the identity and relative proportions of the particular components of a) and b) used, the identity of the thermoplastic polymer in which these components are being used, the amount and type of flame retardant synergist, if any, being used, and the amount of flame retardancy desired in the finished blend. In all cases however the quantity used must be a flame retardant amount, i.e., an amount that increases the flame retardancy in the particular thermoplastic polymer composition being flame retarded. In preferred embodiments a flame retardant amount is an amount which provides test specimens giving at least a V-2 rating in the standard UL test procedure as described in UL-94 Standard for Tests for Flammability of Plastic Materials for Parts in Devices and Appliances. Without limiting the scope of this invention, the amount of the flame retardant compositions of this invention proportioned as above in the substrate or host polymer will usually be such as to provide a bromine content (as Br) in the range of about 2 to about 8 wt %, more usually a bromine content of about 3 to about 6 wt %, such as about 4 wt % especially in the case of some types of HIPS.

The additive and polymer compositions of this invention can contain additional components. One preferred additional component is one or more flame retardant synergists such as, for example, antimony trioxide, antimony pentoxide, antimony phosphate, $KSb(OH)_6$, $NH_4SbF_3$, sodium antimonate, potassium antimonate, zinc antimonate, nickel antimonate, KSb tartrate, zinc borate, or a mixed oxide of boron and zinc which can contain water of hydration, or which can be anhydrous, such as dodecaboron tetrazinc docosaoxide heptahydrate ($4ZnO.6B_2O_3.7H_2O$); zinc borate monohydrate ($4ZnO.B_2O_3.H_2O$); and anhydrous ($2ZnO.3B_2O_3$). Amounts of synergist(s) in the range of about 10 to about 40 wt % based on the total weight of components a) and b) will usually suffice. Preferred amounts arc in the range of about 20 to about 40 wt % based on the total weight of components a) and b).

Another preferred type of additive is at least one tin-based thermal stabilizer, such as organotin oxides and carboxylates such as an dibutyltin maleate and dioctyltin maleate. Amounts of such tin-based thermal stabilizers are typically in the range of about 4 to about 9 wt % based on the total weight of components a) and b). Preferred amounts are in the range of about 5 to about 8 wt % based on the total weight of components a) and b).

Other additives which may be used if desired include, for example, antioxidants, metal scavengers or deactivators, pigments, fillers, impact modifiers, dyes, anti-static agents, processing aids, mold release agents, lubricants, anti-blocking agents, other flame retardants, other thermal stabilizers, and similar materials. Such components are usually used in conventional quantities in accordance with customary practice in the industry, or such as may be recommended by the additive manufacturer. Conduct of a few preliminary optimization tests using different proportions of the selected components can also prove useful. Any additive which would materially detract from one or more of the advantageous performance properties of the composition of this invention when devoid of such additive, should not be included in the composition.

When preparing flame-retarded polymer compositions of this invention, the individual components of the flame retardant composition of this invention can be blended separately and/or in subcombinations with the substrate or host polymer in appropriate proportions. However, it is definitely preferable to blend a preformed additive composition of this invention with the polymer as this minimizes the possibility of blending errors, and is a simpler and less time-consuming blending operation.

The additive compositions of this invention can be formulated as powder blends of the additive components using conventional blending apparatus and techniques. Granular blends can be produced using conventional compactors. Alternatively, the components, e.g., components a) and b) in the relative proportions given above, can be blended together as powder blends, or alternatively as melt blends with the inclusion of some of the substrate polymer in which the additive composition is to blended. Preferred additive compositions of this invention are composed of powder blends of at least above components a) and b) and at least one synthetic zeolite such as zeolite A and/or a hydrotalcite, in the relative proportions given above. These compositions can also contain one of more flame retardant synergists and one or more other components such as those referred to above. However most preferred additive powder blends contain only components a), b), and at least one synthetic zeolite, most preferably zeolite-A, these components being in the relative proportions given above.

Various known procedures can be used to prepare the flame- retardant polymer blends or formulations of this invention. For example the substrate or host polymer and an additive composition of this invention (i.e., a preformed additive composition comprising at least components a) and b), and preferably a synthetic zeolite and/or a hydrotalcite, together with whatever suitable auxiliary additive components as may be selected can be mixed in suitable proportions in a powder blender and then melt extruded. Although less preferable, the substrate or host polymer and the individual components (a), (b), and (c) and whatever suitable auxiliary additive components as may be selected can be added separately and/or in subcombinations (i.e., other than in a combination of (a), (b), and (c) of this invention) to the blending apparatus and mixed during and/or subsequent to the additions. Alternatively the materials, preferably comprising a preformed additive composition of this invention comprising at least components (a), (b), and (c) rather than the individual components, can be compounded using an extruder, most preferably a twin-screw extruder. However, other apparatus such as a Buss kneader may be found useful for such compounding. If glass fibers are being used as a component, it is desirable to add the glass fibers at a downstream portion of the extruder in order to avoid excessive glass fiber breakage. The other additive components utilized in the practice of this invention can be added with the polymer in the initial feed port of the extruder or they can be added to the extruder further downstream. The extrudate from the extruder is typically converted into granules or pellets either by cooling strands of the extruding polymer and subdividing the solidified strands into granules or pellets, or by subjecting the extrudate to concurrent die-faced peletizing and water-cooling or air-cooling.

The compounded polymers of this invention can be processed in conventional ways. For example, the compounds can be transformed into the final articles by appropriate processing techniques such as injection molding, compression molding, extrusion, or like procedures.

The practice and advantages of this invention are illustrated by the following non-limiting Examples.

EXAMPLE 1

A flame retardant additive composition of this invention is formed by blending together 1,2-bis(pentabromophenyl)ethane and tetrabromobisphenol-A-bis(2,3-dibromopropyl ether) as a powder blend in proportions of 60:40 parts by weight, respectively.

EXAMPLE 2

A flame retardant additive composition of this invention is formed by blending together 1,2-bis(pentabromophenyl)ethane and tetrabromobisphenol-A-bis(2,3-dibromopropyl ether) as a powder blend in proportions of 70:30 parts by weight, respectively.

EXAMPLE 3

A group of runs was conducted to determine flame retardant effectiveness, thermal stability, and various other properties of additive compositions in Atofina 4440 Lacgrene® HIPS. In addition to a control using the HIPS with no additives, an HIPS blend was made using tetrabromobisphenol-A-bis(2,3-dibromopropyl ether) (TBE) and antimony oxide, and several HIPS blends of this invention were made containing both 1,2-bis(pentabromophenyl)ethane (BPE) and tetrabromobisphenol-A-bis(2,3-dibromopropyl ether) (TBE) along with antimony oxide. The compositions, tests used, and test results are summarized in Table 1 in which percentages are by weight. Melt Stability was determined by capillary rheometry at 250° C., at a shear rate of 500 per second.

TABLE 1

| Formulation | 1 | 2. | 3 | 4 | 5 |
|---|---|---|---|---|---|
| HIPS | 100% | 94% | 94% | 95% | 94% |
| BPE | | | 3% | 2.4% | 3.5% |
| TBE | | 5% | 2% | 1.6% | 1.5% |
| $Sb_2O_3$ | | 1% | 1% | 1% | 1% |
| Ratio BPE:TBE | | 0:100 | 60:40 | 60:40 | 70:30 |
| Properties | | | | | |
| DTUL (° C.) | 70 | 69 | 70 | 71 | 71 |
| IZOD (ft/lb/in) | 2.1 | 2.0 | 2.0 | 1.9 | 1.7 |
| MFI (g/10 min) @ 200° C./5 kg | 12.3 | 16.2 | 14.1 | 13.8 | 13.7 |

TABLE 1-continued

| Formulation | 1 | 2. | 3 | 4 | 5 |
|---|---|---|---|---|---|
| UL-94, ⅛ in | Burn | V-2 | V-2 | V-2 | V-2 |
| UL-94, 1/16 in | Burn | Burn | V-2 | V-2 | V-2 |
| Melt Stability | | | | | |
| Viscosity at 6.5 min (Pa-s) | 107 | 100 | 104 | 114 | 111 |
| Viscosity at 32.4 min (Pa-s) | 112 | 24 | 105 | 121 | 116 |

EXAMPLE 4

A flame retardant HIPS composition of this invention was formed by blending 1,2-bis(pentabromophenyl)ethane (BPE), tetrabromobisphenol-A-bis(2,3dibromopropyl ether) (TBE) and Zeolite-A with Dow Styron F-200HIPS. The proportions of HIPS:BPE:TBE:Zeo-A were 94:3.2:2.1:0.7 parts by weight, respectively. This composition gave UL-94 ratings of V-2 at both ⅛- and 1/16-inch specimen thicknesses. Other properties were an IZOD impact strength of 2.2 ft-lb/in, a melt flow index (MFI) of 4.6 g/10 min at 200° C. and 5 kg load, and a DTUL of 75° C.

EXAMPLE 5

Several flame retardant additive compositions of this invention were prepared and subjected to thermogravimetric analysis (TGA) testing at a rate of temperature increase of 10° C. per minute. These additive compositions, with percentages being by weight, were:

A) 70% 1,2-bis(pentabromophenyl)ethane; and
   30% tetrabromobisphenol-A-bis(2,3-dibromopropyl ether).

B) 66.04% 1,2-bis(pentabromophenyl)ethane;
   28.30% tetrabromobisphenol-A-bis(2,3-dibromopropyl ether); and
   5.66% hydrotalcite (DHT4A2).

C) 66.04% 1,2-bis(pentabromophenyl)ethane;
   28.30% tetrabromobisphenol-A-bis(2,3-dibromopropyl ether); and
   5.66% Zeolite-A.

For comparison, tetrabromobisphenol-A-bis(2,3-dibromopropyl ether) (D) was subjected to the same thermal stability testing. Each of the compositions of this invention was found to be far more thermally stable than tetrabromobisphenol-A-bis(2,3-dibromopropyl ether) alone, as can be seen from Table 2 which summarizes these test results.

TABLE 2

| Composition | 1 wt % wt loss | 5 wt % wt loss | 10 wt % wt loss | 50 wt % wt loss |
|---|---|---|---|---|
| A | 306.1° C. | 327.7° C. | 337.3° C. | 441.1° C. |
| B | 308.1° C. | 343.8° C. | 352.3° C. | 426.7° C. |
| C | 281.9° C. | 341.5° C. | 349.3° C. | 446.7° C. |
| D | 280.8° C. | 303.2° C. | 311.5° C. | 326.8° C. |

EXAMPLE 6

A pair of polyolefin compositions of this invention were prepared. One was a polypropylene copolymer blend containing 3 wt % of a powder blend as in Example 2 together with 1.5 wt % of antimony oxide. This composition gave V-2 UL 94 ratings, was found to have satisfactory physical properties, and in addition was found not to bloom after 4 hours at 80° C. The other composition was the same except that it was made with 3.5 wt % of a powder blend as in Example 2 together with 1 wt % of antimony oxide. The polypropylene copolymer used in these compositions was Moplen® EPF-31H from Basell Technology Company bv.

EXAMPLE 7

A flame retardant additive composition of this invention is formed by blending together decabromodiphenyl oxide and tetrabromobisphenol-A-bis(2,3-dibromopropyl ether) as a powder blend in proportions of 70:30 parts by weight, respectively.

EXAMPLE 8

A flame retardant HIPS composition of this invention was formed by blending decabromodiphenyl oxide (DDO), tetrabromobisphenol-A-bis(2,3-dibromopropyl ether) (TBE) and antimony oxide with Atofina 4440 Lacgrene HIPS. The proportions of HIPS:DDO:TBE:$Sb_2O_3$ were 94:3.5:1.5:1.0 parts by weight, respectively. This composition gave UL-94 ratings of V-2 at both ⅛- and 1/16-inch (3.2 mm and 1.6 mm) specimen thicknesses. Other properties were a notched IZOD impact strength of 8.48 kJ/$m^2$, a melt flow index (MFI) of 17.1 g/10 min at 200° C. and 5 kg load, and a DTUL of 70.9° C.

EXAMPLE 9

A flame retardant polyolefin composition of this invention was formed by blending with LDPE (Elenac® 25-020FA; BASF AG), 6 wt % of a mixture of 70 wt % 1,2-bis(pentabromophenyl)ethane and 30 wt % tetrabromobisphenol-A-bis(2,3-dibromopropyl ether), and 3 wt % antimony oxide. This produced molded specimens which had V-2 UL-94 ratings at both 1.6 and 3.2 mm thicknesses.

EXAMPLE 10

A group of tests was carried out in which four different compositions of this invention were compared in thermal stability against a comparative composition in which the brominated flame retardants were used in proportions described in Japan Kokai 08-208939 A2, laid open Aug. 13, 1996. In this group of tests the respective flame retardant combinations were blended with Atofina 4440 Lacgrene HIPS to provide the test compositions. While maintaining the test compositions at 270° C. under a shear rate of 2000 per second, viscosity determinations were made over time using a Rosand capillary rheometer. Thus, the greater the thermal stability of a composition, the less the drop in viscosity during the test. Conversely, the poorer the thermal stability of a composition, the greater the drop in viscosity during the test. The additive compositions of this invention tested were as follows:

A) 70% 1,2-bis(pentabromophenyl)ethane; and
  30% tetrabromobisphenol-A-bis(2,3-dibromopropyl ether).
B) 31.45% 1,2-bis(pentabromophenyl)ethane;
  62.89% tetrabromobisphenol-A-bis(2,3-dibromopropyl ether); and
  5.66% Zeolite-A.
C) 70% decabromodiphenyl oxide; and
  30% tetrabromobisphenol-A-bis(2,3-dibromopropyl ether).
D) 66.04% decabromodiphenyl oxide;
  28.30% tetrabromobisphenol-A-bis(2,3-dibromopropyl ether); and
  5.66% Zeolite-A.

The comparative additive composition not of this invention was:

X) 33.33% 1,2-bis(pentabromophenyl)ethane; and
  66.67% tetrabromobisphenol-A-bis(2,3-dibromopropyl ether).

Each test composition contained 5 wt % of the particular additive composition being tested. The results of these tests are depicted in FIG. 1 wherein the same above lettering is applied to the plot as used above. It can be seen that each of the compositions of this invention were significantly more thermally stable than blend X) in which the closest proportions of the prior art were used. Note also from curve B where the closest proportions of the prior art were used but where pursuant to this invention a component c) (i.e., Zeolite-A) was also used, a dramatic improvement was achieved as compared to blend X.

EXAMPLE 11

Figure 2:
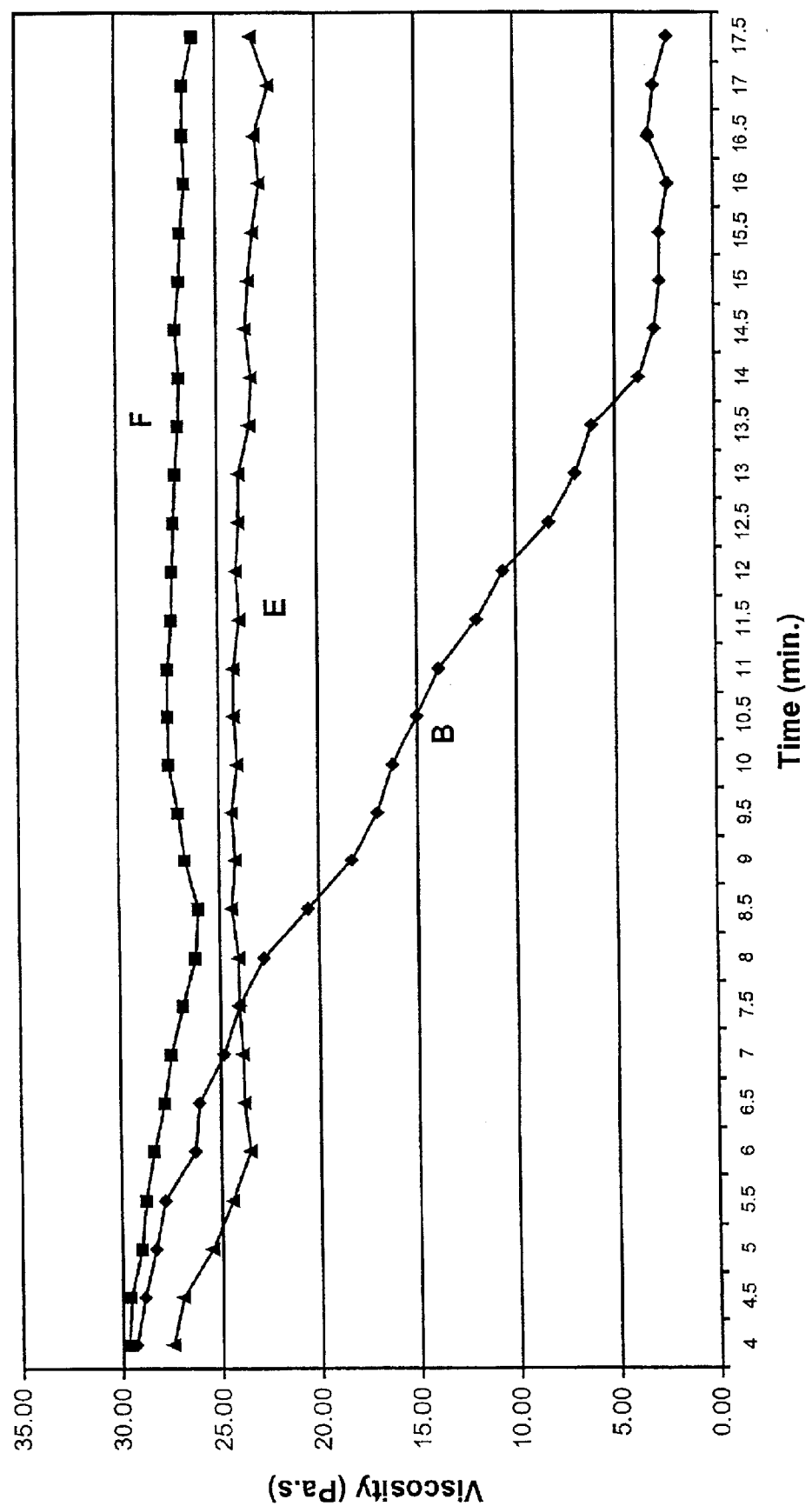
FIG. 2 is a group of plots of thermal stability data obtained at 280° C. using capillary rheometry in which the thermal stabilities of three flame retarded compositions of this invention are compared, and illustrate the excellent thermal stability achievable with two of the preferred compositions of this invention.

Additional thermal stability tests were performed as in Example 10 but at 280° C., and test results are depicted in FIG. 2. The additive compositions of these tests were as follows:

B) 31.45% 1,2-bis(pentabromophenyl)ethane;
  62.89% tetrabromobisphenol-A-bis(2,3-dibromopropyl ether); and
  5.66% Zeolite-A.
E) 66.04% 1,2-bis(pentabromophenyl)ethane;
  28.30% tetrabromobisphenol-A-bis(2,3-dibromopropyl ether); and
  5.66% Zeolite-A.
F) 66.04% decabromodiphenyl oxide;
  28.30% tetrabromobisphenol-A-bis(2,3-dibromopropyl ether); and
  5.66% Zeolite-A.

It can be seen that of the three compositions of this invention in which a component c) (i.e., Zeolite-A) was used, compositions in which the preferred proportions of components a) and b) are used are even more thermally stable than where the proportions of these two components (but not the overall composition) are as in the prior art.

This invention thus enables the provision of low cost flame retardants suitable for providing flame retarded polymers such as HIPS with good melt flow, good impact strength, and high thermal stabilities (e.g., up to about 290° C.). Such compositions are suitable for a variety of uses such as in the manufacture of parts or casings for video and high fidelity electronic applications. This invention also enables the provision of low cost flame retardant polyolefin homopolymers and copolymers such as polyethylene homopolymers and copolymers, and polypropylene homopolymers and copolymers having good physical properties including lack of adverse blooming tendencies.

It is to be understood that the reactants and components referred to by chemical name or formula anywhere in this document, whether referred to in the singular or plural, are identified as they exist prior to coming into contact with another substance referred to by chemical name or chemical type (e.g., another component or polymer, or etc.). It matters not what preliminary chemical changes, transformations and/or reactions, if any, take place in the resulting mixture as such changes, transformations and/or reactions are the natural result of bringing the specified components together under the conditions called for pursuant to this disclosure. Thus the reactants and other materials are identified as components to be brought together in connection with performing a desired operation or in forming a mixture to be used in conducting a desired operation. Thus, even though substances, components and/or ingredients may be referred to in the present tense ("comprises", "is", etc.), the reference is to the substance, component, or ingredient as it existed at the time just before it was first contacted, blended or mixed with one or more other substances, components, or ingredients in accordance with the present disclosure.

Except as may be expressly otherwise indicated, the article "a" or "an" if and as used herein is not intended to limit, and should not be construed as limiting, a statement to a single element to which the article refers. Rather, the article "a" or "an" if and as used herein is intented to cover one or more such elements, unless the text or context expressly indicates otherwise.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A flame retardant additive composition which comprises a mixture of:
   a) at least one polybromodiphenylalkane in which the phenyl groups are substituted by a total of at least 6 bromine atoms per molecule and in which the alkane portion of the molecule contains 1 to 3 carbon atoms, and
   b) at least one tetrabromobisphenol-A-bis(bromoalkyl ether);
   in proportions such that per each 100 parts by weight of a) and b), 50 to 80 parts by weight are a) and 50 to 20 parts by weight are b).

2. A composition of claim 1 wherein a) is 1,2-bis(pentabromophenyl)ethane and wherein b) is tetrabromobisphenol-A-bis(2,3-dibromopropyl ether).

3. A composition of claim 1 wherein a) is 1 2-bis(pentabromophenyl)ethane.

4. A composition of any of claims 1–3 wherein said proportions are such that per each 100 parts by weight of a) and b), 60 to 75 parts by weight are a) and 40 to 25 parts by weight are b).

5. A composition of any of claims 1–3 wherein said proportions are such that per each 100 parts by weight of a) and b), about 70 parts by weight are a) and about 30 parts by weight are b).

6. A flame retardant additive composition which comprises a mixture of:
   a) at least one polybromodiphenylalkane in which the phenyl groups are substituted by a total of at least 6 bromine atoms per molecule and in which the alkane portion of the molecule contains 1 to 3 carbon atoms;
   b) at least one tetrabromobisphenol-A-bis(bromoalkyl ether) in proportions such that per each 100 parts by weight of a) and b), 20 to 80 parts by weight are a) and 80 to 20 parts by weight are b); and
   c) at least one synthetic zeolite or at least one hydrotalcite, or both, in an amount such that there is one part by weight thereof per each 4 to 6 parts by weight of tetrabromobisphenol-A-bis(bromoalkyl ether) in the mixture of a) and b).

7. A composition of claim 6 wherein the proportions of a) and b) are such that per each 100 parts by weight of a) and b), 50 to 80 parts by weight are a) and 50 to 20 parts by weight are b).

8. A composition of claim 7 wherein a) is 1,2-bis(pentabromophenyl)ethane.

9. A composition of claim 7 wherein b) is tetrabromobisphenol-A-bis(2,3-dibromopropyl ether).

10. A composition of claim 7 wherein a) is 1,2-bis(pentabromophenyl)ethane and wherein b) is tetrabromobisphenol-A-bis(2,3dibromopropyl ether).

11. A composition of claim 6 wherein a) is 1,2-bis(pentabromophenyl)ethane.

12. A composition of claim 7 wherein c) is a synthetic zeolite.

13. A composition of claim 7 wherein c) is a hydrotalcite.

14. A composition of claim 7 wherein c) is Zeolite-A.

15. A composition of claim 6 wherein the proportions of a) and b) are such that per each 100 parts by weight of a) and b), 60 to 75 parts by weight are a) and 40 to 25 parts by weight are b).

16. A composition of claim 15 wherein a) is at least one polybromodiphenylalkane in which said alkane portion of the molecule contains 2 carbon atoms, wherein b) is tetrabromobisphenol-A-bis(2,3-dibromopropyl ether), and wherein c) is a synthetic zeolite.

17. A composition of claim 15 wherein a) is 1,2-bis(pentabromophenyl)ethane, wherein b) is tetrabromobisphenol-A-bis(2,3-dibromopropyl ether), and wherein c) is a synthetic zeolite.

18. A composition of claim 6 wherein the proportions of a) and b) are such that per each 100 parts by weight of a) and b), about 70 parts by weight are a) and about 30 parts by weight are b).

19. A composition of claim 18 wherein a) is 1,2-bis(pentabromophenyl)ethane, wherein b) is tetrabromobisphenol-A-bis(2,3-dibromopropyl ether), and wherein c) is Zeolite-A.

20. A composition of claim 6 wherein said additive composition further comprises at least one flame retardant synergist.

21. A flame retardant polymer composition which comprises at least one thermoplastic polymer with which has been blended, separately or in combination, a flame-retardant amount of:
   a) at least one polybromodiphenylalkane in which the phenyl groups are substituted by a total of at least 6 bromine atoms per molecule and in which the alkane portion of the molecule contains 1 to 3 carbon atoms; and
   b) at least one tetrabromobisphenol-A-bis(bromoalkyl ether);
   in proportions such that per each 100 parts by weight of a) and b) blended into the composition, 50 to 80 parts by weight are a) and 50 to 20 parts by weight are b).

22. A composition of claim 21 wherein the thermoplastic polymer is a thermoplastic polymer having polymerized ethylenic linkages.

23. A composition of claim 21 wherein the thermoplastic polymer is a vinylaromatic homopolymer or copolymer or a polyolefin homopolymer or copolymer.

24. A composition of claim 21 wherein the thermoplastic polymer is a high impact polystyrene polymer.

25. A composition of claim 21 wherein the thermoplastic polymer is a polyethylene homopolymer, a polypropylene homopolymer, or an copolymer of ethylene and at least one alpha-olefin monomer having in the range of 3 to about 8 carbon atoms in the molecule.

26. A composition of claim 21 wherein a) is 1,2-bis(pentabromophenyl)ethane and wherein b) is tetrabromobisphenol-A-bis(2,3dibromopropyl ether).

27. A composition of claim 21 wherein a) is 1,2bis(pentabromophenyl)ethane and wherein b) is tetrabromobisphenol-A-bis(2,3-dibromopropyl ether).

28. A composition of claim 21 wherein said proportions are such that per each 100 parts by weight of a) and b) blended into the composition, 60 to 75parts by weight are a) and 40 to 25 parts by weight are b).

29. A composition of claim 28 wherein a) is at least one polybromodiphenylalkane in which said alkane portion of the molecule contains 2 carbon atoms.

30. A composition of claim 28 wherein a) is 1,2-bis(pentabromophenyl)ethane.

31. A composition of claim 21 wherein said proportions are such that per each 100 parts by weight of a) and b) blended into the composition, about 70 parts by weight are a) and about 30 parts by weight are b).

32. A composition of claim 31 wherein a) is 1,2-bis(pentabromophenyl)ethane and wherein b) is tetrabromobisphenol-A-bis(2,3-dibromopropyl ether).

33. A composition of claim 32 wherein the thermoplastic polymer is a vinylaromatic homopolymer or copolymer or polyolefin homopolymer or copolymer.

34. A composition of claim 32 wherein the thermoplastic polymer is a high impact polystyrene polymer.

35. A flame retardant polymer composition which comprises at least one thermoplastic polymer with which has been blended, separately or in combination, a flame-retardant amount of:
  a) at least one polybromodiphenylalkane in which the phenyl groups are substituted by a total of at least 6 bromine atoms per molecule and in which the alkane portion of the molecule contains 1 to 3 carbon atoms;
  b) at least one tetrabromobisphenol-A-bis(bromoalkyl ether) in proportions such that per each 100 parts by weight of a) and b) blended into the composition, 20 to 80 parts by weight are a) and 80 to 20 parts by weight are b); and
  c) at least one synthetic zeolite or at least one hydrotalcite, or both, in an amount such that there is one part by weight thereof per each 4 to 6 parts by weight of tetrabromobisphenol-A-bis(bromoalkyl ether) blended into the composition.

36. A composition of claim 35 wherein the proportions of a) and b) are such that per each 100 parts by weight of a) and b) blended into the composition, 50 to 80 parts by weight are a) and 50 to 20 parts by weight are b).

37. A composition of claim 36 wherein the thermoplastic polymer is a thermoplastic polymer having polymerized ethylenic linkages.

38. A composition of claim 36 wherein the thermoplastic polymer is a vinylaromatic homopolymer or copolymer or polyolefin homopolymer or copolymer.

39. A composition of claim 36 wherein the thermoplastic polymer is a high impact polystyrene polymer.

40. A composition of claim 36 wherein the thermoplastic polymer is a polyethylene homopolymer, a polypropylene homopolymer, or an copolymer of ethylene and at least one alpha-olefin monomer having in the range of 3 to about 8 carbon atoms in the molecule.

41. A composition of claim 36 wherein a) is at least one polybromodiphenylalkane in which said alkane portion of the molecule contains 2 carbon atoms, and wherein b) is tetrabromobisphenol-A-bis(2,3-dibromopropyl ether).

42. A composition of claim 41 wherein c) is a synthetic zeolite.

43. A composition of claim 41 wherein c) is a hydrotalcite.

44. A composition of any of claims 41–43 wherein the thermoplastic polymer is (i) a vinylaromatic homopolymer or copolymer, or (ii) a polyolefin homopolymer or copolymer.

45. A composition of any of claims 41–43 wherein the thermoplastic polymer is a high impact polystyrene.

46. A composition of any of claims 41–43 wherein the thermoplastic polymer is a high impact polystyrene, wherein a) is 1,2-bis(pentabromophenyl)ethane, wherein b) is tetrabromobisphenol-A-bis(2,3-dibromopropyl ether), and wherein c) is Zeolite-A.

47. A composition of claim 35 wherein the proportions of a) and b) are such that per each 100 parts by weight of a) and b) blended into the composition, 60 to 75 parts by weight are a) and 40 to 25 parts by weight are b).

48. A composition of claim 47 wherein the thermoplastic polymer is a polyethylene homopolymer, a polypropylene homopolymer, or an copolymer of ethylene and at least one alpha-olefin monomer having in the range of 3 to about 8 carbon atoms in the molecule, wherein a) is 1,2-bis(pentabromophenyl)ethane, wherein b) is tetrabromobisphenol-A-bis(2,3-dibromopropyl ether), and wherein c) is Zeolite-A.

49. A composition of claim 47 wherein the thermoplastic polymer is a vinylaromatic homopolymer or copolymer, wherein a) is 1,2-bis(pentabromophenyl)ethane, wherein b) is tetrabromobisphenol-A-bis(2,3-dibromopropyl ether), and wherein c) is Zeolite-A.

50. A composition of claim 47 wherein the thermoplastic polymer is a high impact polystyrene, wherein a) is 1,2-bis(pentabromophenyl)ethane, wherein b) is tetrabromobisphenol-A-bis(2,3-dibromopropyl ether), and wherein c) is Zeolite-A.

51. A composition of claim 35 wherein the proportions of a) and b) are such that per each 100 parts by weight of a) and b) blended into the composition, about 70 parts by weight are a) and about 30 parts by weight are b).

52. A composition of claim 51 wherein the thermoplastic polymer is a polyethylene homopolymer, a polypropylene homopolymer, or an copolymer of ethylene and at least one alpha-olefin monomer having in the range of 3 to about 8 carbon atoms in the molecule, wherein a) is 1,2-bis(pentabromophenyl)ethane, wherein b) is tetrabromobisphenol-A-bis(2,3dibromopropyl ether), and wherein c) is Zeolite-A.

53. A composition of claim 51 wherein the thermoplastic polymer is a vinylaromatic homopolymer or copolymer, wherein a) is 1,2-bis(pentabromophenyl)ethane, wherein b) is tetrabromobisphenol-A-bis(2,3-dibromopropyl ether), and wherein c) is Zeolite-A.

54. A composition of claim 51 wherein the thermoplastic polymer is a high impact polystyrene, wherein a) is 1,2-bis(pentabromophenyl)ethane, wherein b) is tetrabromobisphenol-A-bis(2,3-dibromopropyl ether), and wherein c) is Zeolite-A.

55. A molded or extruded article or shape formed from a composition of any of claims 21, 28, 35, 36, 48, 49, or 50.

56. A method of producing a molded or extruded article or shape which method comprises molding or extruding a composition of any of claims 21, 28, 35, 36, 48, 49, or 50 while in a molten condition.

* * * * *